United States Patent
Sjödin et al.

(10) Patent No.: US 10,306,685 B2
(45) Date of Patent: May 28, 2019

(54) METHOD AND NODES FOR HANDLING A GTP-U DIRECT TUNNEL

(71) Applicant: TELEFONAKTIEBOLAGET LM ERICSSON (PUBL), Stockholm (SE)

(72) Inventors: Erik Sjödin, Kungsbacka (SE); Micael Martell, Kungsbacka (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 40 days.

(21) Appl. No.: 15/302,622

(22) PCT Filed: Apr. 22, 2014

(86) PCT No.: PCT/EP2014/058119
§ 371 (c)(1),
(2) Date: Oct. 7, 2016

(87) PCT Pub. No.: WO2015/161867
PCT Pub. Date: Oct. 29, 2015

(65) Prior Publication Data
US 2017/0064751 A1    Mar. 2, 2017

(51) Int. Cl.
*H04W 4/00* (2018.01)
*H04W 76/11* (2018.01)
*H04W 76/12* (2018.01)

(52) U.S. Cl.
CPC .......... *H04W 76/11* (2018.02); *H04W 76/12* (2018.02)

(58) Field of Classification Search
CPC . H04W 76/022; H04W 76/021; H04W 24/08; H04W 76/02; H04W 76/06; H04W 88/16
See application file for complete search history.

(56) References Cited

U.S. PATENT DOCUMENTS

2011/0075557 A1* 3/2011 Chowdhury ............ H04L 12/14
370/230
2011/0222430 A1* 9/2011 Angervuori ......... H04L 12/4633
370/252

(Continued)

FOREIGN PATENT DOCUMENTS

| EP | 2709340 A2 | 3/2014 |
| WO | 2010062095 A2 | 6/2010 |
| WO | 2011053039 A2 | 5/2011 |

OTHER PUBLICATIONS

International Search Report and Written Opinion dated Mar. 4, 2015, in International Application No. PCT/EP2014/058119, 13 pages.

*Primary Examiner* — Abdelnabi O Musa
(74) *Attorney, Agent, or Firm* — Rothwell, Figg, Ernst & Manbeck, P.C.

(57) ABSTRACT

The embodiments herein relate to a method in a CN node (303) for handling a GTP-U tunnel. When the GTP-U tunnel is to be set up, the CN node transmits a first message to a RAN gateway (305). The first message comprises a request for information identifying the RAN gateway (305). The CN node (303) receives a second message from the RAN gateway (305). The second message comprises the requested information identifying the RAN gateway (305). The CN node (303) determines a first endpoint node and a second endpoint node of the GTP-U tunnel. The first endpoint node is the RAN node (301) and the second endpoint node is the RAN gateway (305).

38 Claims, 14 Drawing Sheets

(56) References Cited

U.S. PATENT DOCUMENTS

| | | | |
|---|---|---|---|
| 2013/0016696 A1* | 1/2013 | Adjakple | H04W 28/0252 370/331 |
| 2013/0053029 A1* | 2/2013 | Anchan | H04W 76/12 455/432.3 |
| 2013/0064158 A1* | 3/2013 | Sundell | H04W 76/02 370/311 |
| 2013/0272127 A1* | 10/2013 | Ali | H04W 76/022 370/235 |
| 2013/0301611 A1* | 11/2013 | Baghel | H04W 76/12 370/331 |
| 2014/0355508 A1* | 12/2014 | Anchan | H04W 4/10 370/312 |

\* cited by examiner

METHOD AND NODES FOR HANDLING A GTP-U DIRECT TUNNEL

CROSS REFERENCE TO RELATED APPLICATION(S)

This application is a 35 U.S.C. § 371 National Phase Entry Application from PCT/EP2014/058119, filed Apr. 22, 2014, designating the United States, the disclosure of which is incorporated herein in its entirety by reference.

TECHNICAL FIELD

Embodiments herein relate generally to a Core Network (CN) node, a method in the CN node, a Radio Access Network (RAN) gateway and a method in the RAN gateway. More particularly the embodiments herein relate to handling a General packet radio service Tunnelling Protocol-User plane (GTP-U) tunnel.

BACKGROUND

Today a gateway node such as e.g. the Gateway GPRS Support Node (GGSN) or the Packet data network GateWay (PGW) is one of the endpoints for the GPRS Tunneling Protocol-User plane (GTP-U) tunnel in a 3rd Generation Partnership Project (3GPP) communications system. The other endpoint for the GTP-U tunnel is a Radio Access Network, RAN, node such as e.g. an evolved Node B (eNB), a Node B (NB), a base station or a Radio Network Controller (RNC). All traffic originating or terminating in a wireless device has to go through the gateway. The term GPRS mentioned above is short for general packet radio service.

FIG. 1a illustrates the GTP-U tunnel and the GTP-Control plane (GTP-C) tunnel in a Wideband Code Division Multiple Access (WCDMA) system 100. WCDMA is also referred to as a Third Generation (3G) technology. The WCDMA system 100 comprises an NB/RNC 101, a Serving GPRS Support Node (SGSN) 103, a GGSN 105, a wireless device 115 and Internet 120. The WCDMA system 100 in FIG. 1a is exemplified with two wireless devices 115, however any other suitable number of wireless devices is equally applicable. Internet 120 may be represented by e.g. an Internet server.

In the example WCDMA system 100 in FIG. 1a, the GTP-U tunnel is between the NB/RNC 101 and the SGSN 103 and between the SGSN 103 and the GGSN 105. The GTP-C tunnel is also between the NB/RNC 101 and the SGSN 103 and between the SGSN 103 and the GGSN 105.

A 3G GTP-U direct tunnel is realized for WCDMA systems where the direct tunnel is between the RNC and the GGSN. This is illustrated in FIG. 1b. As seen in FIG. 1b, the GTP-C tunnel is between the NB/RNC 101 and the SGSN 103 and between the SGSN 103 and the GGSN 105 as in FIG. 1a. The difference between FIGS. 1a and 1b is the GTP-U tunnel. In FIG. 1b, there is a 3G GTP-U direct tunnel which is located between the NB/RNC 101 and the GGSN 105. The 3G GTP-U direct tunnel bypasses and relieves the SGSN 103 of transit traffic to and from the GGSN 105.

FIG. 2 illustrates the GTP-U tunnel and the GTP-C tunnel in a Long Term Evolution (LTE) system, 200. The LTE system 200 then comprises an eNB 201, a Serving GateWay (SGW) 203, a Packet data network GateWay (PGW) 205, a Mobility Management Entity (MME) 208, a wireless device 215 and Internet 220. The LTE system 200 in FIG. 2 is exemplified with two wireless devices 215, however any other suitable number of wireless devices is equally applicable. Internet 220 may be represented by e.g. an Internet server. As seen in FIG. 2, the GTP-C tunnel is between the eNB 201 and the MME 208, and between the MME 208 and the SGW 2023. The GTP-U tunnel in the LTE system 200 is between the eNB 201 and the SGW 203, and between the SGW 203 and the PGW 205.

The wireless devices 115, 215 illustrated in FIGS. 1a, 1b and 2 may each be a device by which a subscriber may access services offered by an operator's network and services outside operator's network to which the operator's network provide access, e.g. access to the Internet. The wireless devices 115, 215 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device, Internet of Things (IoT) device or any type of consumer electronic, for instance but not limited to television, radio, lighting arrangements, tablet computer, laptop or Personal Computer (PC). The wireless devices 115, 215 may be portable, pocket storable, hand held, computer comprised, or vehicle mounted devices, enabled to communicate voice and/or data, via the access network, with another entity, such as another device or a server.

One problematic issue is that the packet core network introduces unnecessary latency and traffic load for end to end communication for wireless devices within the same coverage area. If an RAN node is separated/disconnected from the packet core network for any reason, wireless devices registered to that RAN node will lose the ability to send data on their existing packet data connections.

SUMMARY

An objective of embodiments herein is therefore to obviate at least one of the above disadvantages and to provide improved efficiency and flexibility in a communications system.

According to a first aspect, the objective is achieved by a method in a CN node for handling a GTP-U, tunnel. When the GTP-U tunnel is to be set up, the CN node transmits a first message to a RAN gateway. The first message comprises a request for information identifying the RAN gateway. The CN node receives a second message from the RAN gateway. The second message comprises the requested information identifying the RAN gateway. The CN node determines a first endpoint node and a second endpoint node of the GTP-U tunnel. The first endpoint node is the RAN node and the second endpoint node is the RAN gateway.

According to a second aspect, the objective is achieved by a method in an RAN gateway for handling a GTP-U tunnel. When the GTP-U tunnel is to be set up, the RAN gateway receives a first from a RAN node. The first message comprises a request for information identifying the RAN gateway. The RAN gateway transmits a second message to the RAN node. The second message comprises the requested information identifying the RAN gateway. The RAN gateway directly tunnels user plane data between a first wireless device and a second wireless device via the GTP-U tunnel. The RAN node is a first endpoint node of the GTP-U tunnel and the RAN gateway is a second endpoint node of the GTP-U tunnel.

According to a third aspect, the objective is achieved by a CN node for handling a GTP-U tunnel. The CN node being adapted to, when the GTP-U tunnel is to be set up, transmit a first message to a RAN gateway. The first message comprises a request for information identifying the RAN gateway. The CN node is further adapted to receive a second message from the RAN gateway. The second message comprises the requested information identifying the RAN gateway. The CN node is further adapted to determine a first endpoint node and a second endpoint node of the GTP-U tunnel. The first endpoint node is the RAN node and the second endpoint node is the RAN gateway.

According to a fourth aspect, the objective is achieved by a RAN gateway for handling a GTP-U tunnel. The RAN gateway being adapted to, when the GTP-U tunnel is to be set up, receive a first from a RAN node. The first message comprises a request for information identifying the RAN gateway. The RAN gateway is further adapted to transmit a second message to the RAN node. The second message comprises the requested information identifying the RAN gateway. The RAN gateway is further adapted to directly tunnel user plane data between a first wireless device and a second wireless device via the GTP-U tunnel. The RAN node is a first endpoint node of the GTP-U tunnel and the RAN gateway is a second endpoint node of the GTP-U tunnel.

Since the GTP-U tunnel is redirected so that is between the RAN node and the network node, efficiency and flexibility in the communication system is improved.

Embodiments herein afford many advantages, of which a non-exhaustive list of examples follows:

An advantage of the embodiments herein may be that they reduce the end to end latency in the communications system.

Another advantage of the embodiments herein may be that they provide a step towards realizing a S1-less RAN node function.

Furthermore, an advantage of the embodiments herein may be that local services may survive a RAN node decoupling from the packet CN.

Another advantage is that the embodiments herein may provide backhaul offloading for traffic intense local communication.

The embodiments herein may also provide the advantage of being a RAN node resilience feature.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1A:
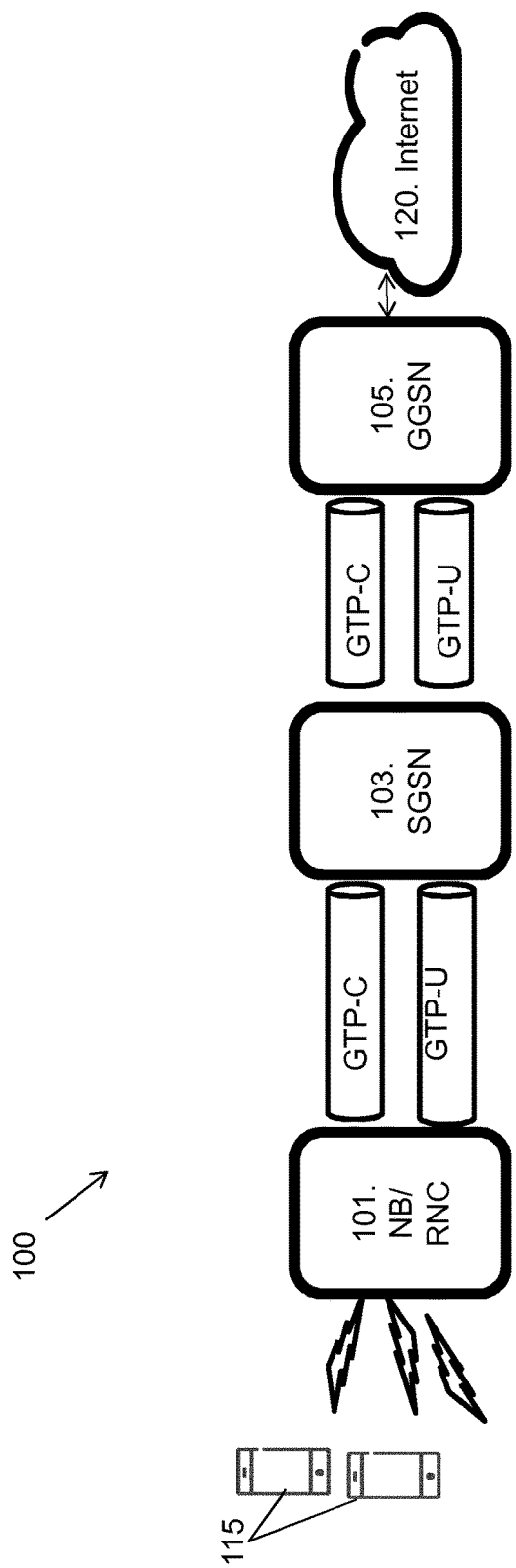
FIG. 1a is a schematic block diagram illustrating embodiments of a WCDMA network with a GTP-C tunnel and a GTP-U tunnel.
Figure 1B:
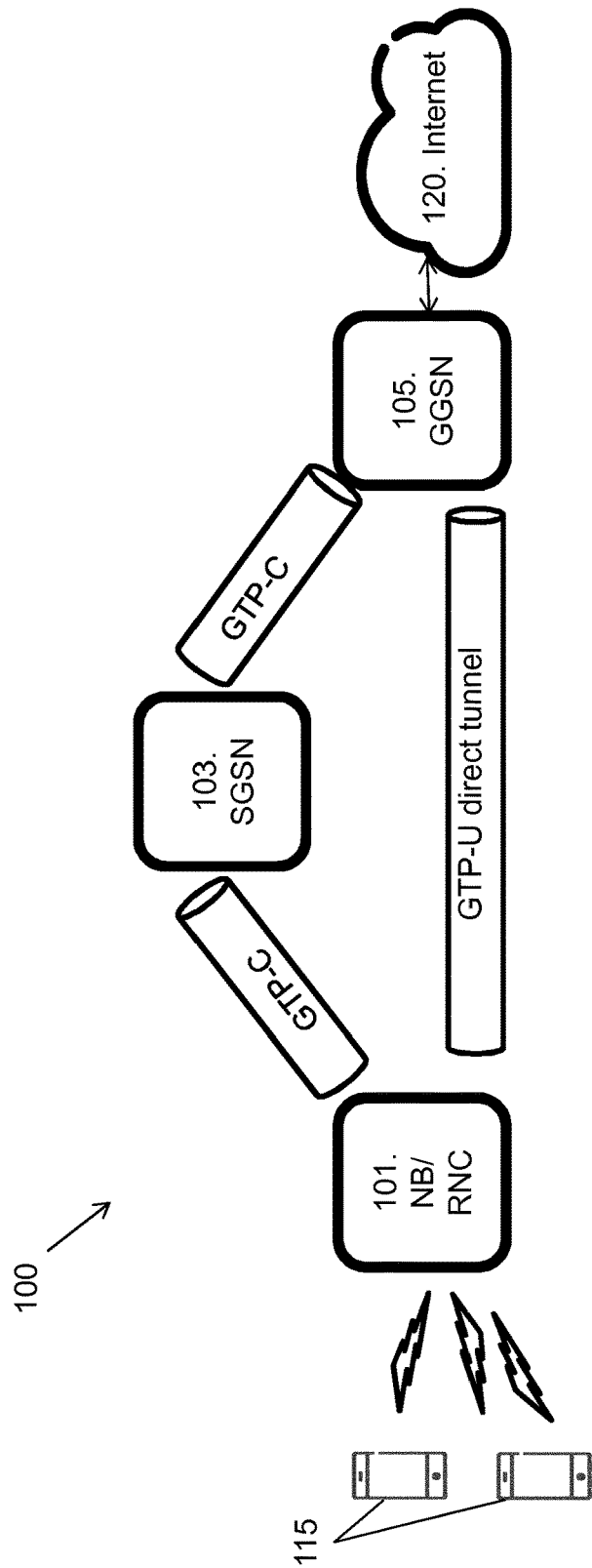
FIG. 1b is a schematic block diagram illustrating embodiments of a WCDMA network with a GTP-C tunnel and a 3 direct GTP-U tunnel.
Figure 2:
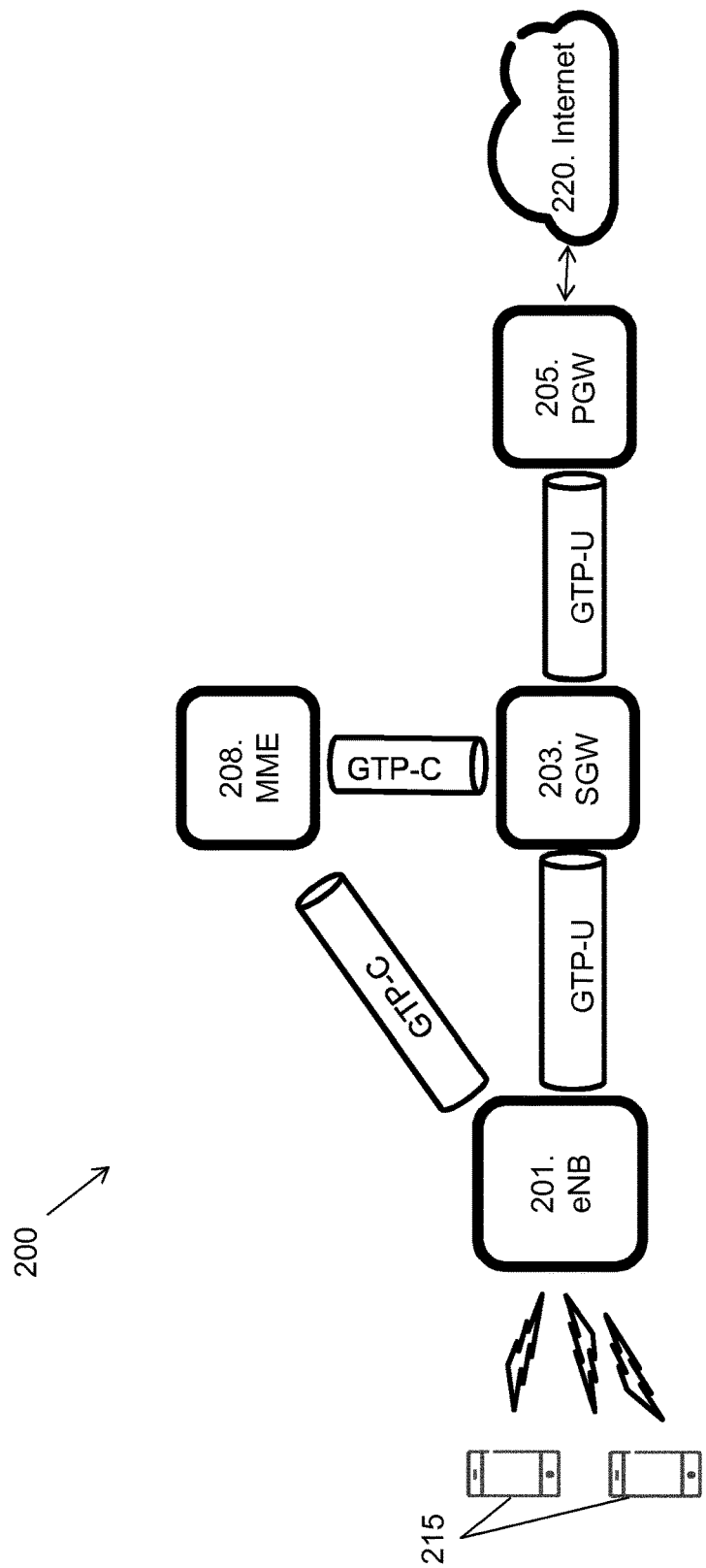
FIG. 2 is a schematic block diagram illustrating embodiments of a LTE network with a GTP-C tunnel and a GTP-U tunnel.
Figure 3A:
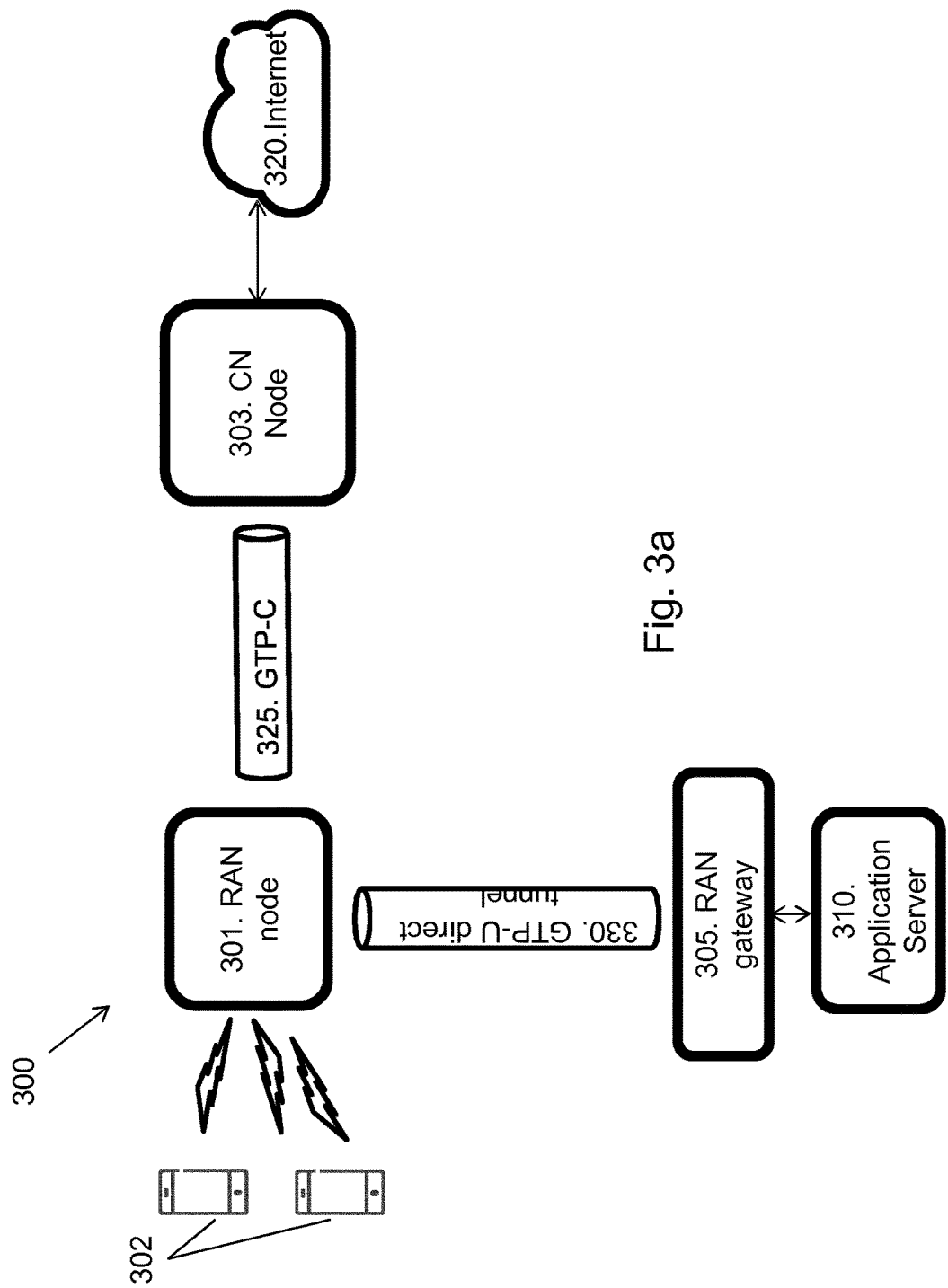
FIG. 3a is a schematic block diagram illustrating embodiments of a communications network comprising a GTP-U direct tunnel.

With the embodiments herein, the GTP-U tunnel is terminated directly in a GTP-U endpoint function in front of the local application environment. The redirection of the GTP-U tunnel endpoint may be achieved by allowing the GGSN/EPG to replace its own Fully qualified-Tunnel Endpoint Identifier (F-TEID) with the F-TEID of the GTP endpoint function FIG. 3a depicts a communications system 300 in which embodiments herein may be implemented. The communications system 300 may in some embodiments apply to one or more radio access technologies such as for example LTE, LTE Advanced, WCDMA, Global System for Mobile Communications (GSM), or any other Third Generation Partnership Project (3GPP) access technology, or other suitable access technologies. The communications system 300 comprises a RAN node 301 serving a cell (not shown). The RAN node 101 may be a base station such as a NB, an eNB, a RNC, or any other network unit capable to communicate over a radio carrier with a wireless device 302 being present in the cell. Note that FIG. 3 is illustrated with two wireless devices 302, but any other suitable number of wireless devices is equally applicable as understood by the skilled person.

The wireless device 302 may be a device by which a subscriber may access services offered by an operator's network and services outside operator's network to which the operators radio access network and core network provide access, e.g. access to the Internet. The wireless device 302 may be any device, mobile or stationary, enabled to communicate in the communications network, for instance but not limited to e.g. user equipment, mobile phone, smart phone, sensors, meters, vehicles, household appliances, medical appliances, media players, cameras, M2M device, D2D device, IoT device or any type of consumer electronic, for instance but not limited to television, radio, lighting arrangements, tablet computer, laptop or PC. The wireless device 302 may be portable, pocket storable, hand held, computer comprised, or vehicle mounted devices, enabled to communicate voice and/or data, via the radio access network, with another entity, such as another wireless device or a server.

It should be noted that the communication links in the communications system 300 may be of any suitable kind including either a wired or wireless link. The links may use any suitable protocol depending on type and level of layer (e.g. as indicated by the Open Systems Interconnection (OSI) model) as understood by the person skilled in the art.

The communications system 300 further comprises a CN node 303 which may be a SGW or a SGSN etc.

The communications system 300 comprises a RAN gateway 305. The RAN gateway 305 may comprise a GTP-U tunnel endpoint function. In some embodiments, the RAN gateway 305 is a standalone entity for example being located in proximity of the RAN node 301. In other embodiments, the RAN gateway 305 is co-located with the RAN node 301, i.e. the RAN gateway 305 and the RAN node 301 together constitute one entity.

The communication system 300 comprises an application server 310. The application server 310 may also be referred to as a proximity application Server. The application server 310 may comprise applications and it may be co-located with RAN node 301. The applications comprised in the application server 310 may be used by the users of the wireless device 302. With the embodiments herein, there is a direct connection between the wireless device 302/RAN node 301 and the applications in the application server 310. The communications system 300 also comprises Internet 320 which may be represented by e.g. an Internet server.

A GTP-C tunnel 325 is located between the RAN node 301 and the CN node 303. A GTP-U direct tunnel 330 is located between the RAN node 301 and the RAN gateway 305. The GTP-U direct tunnel 330 according to the embodiments herein may also be referred to as a 3GPP GTP-U direct tunnel.

Figure 3B:
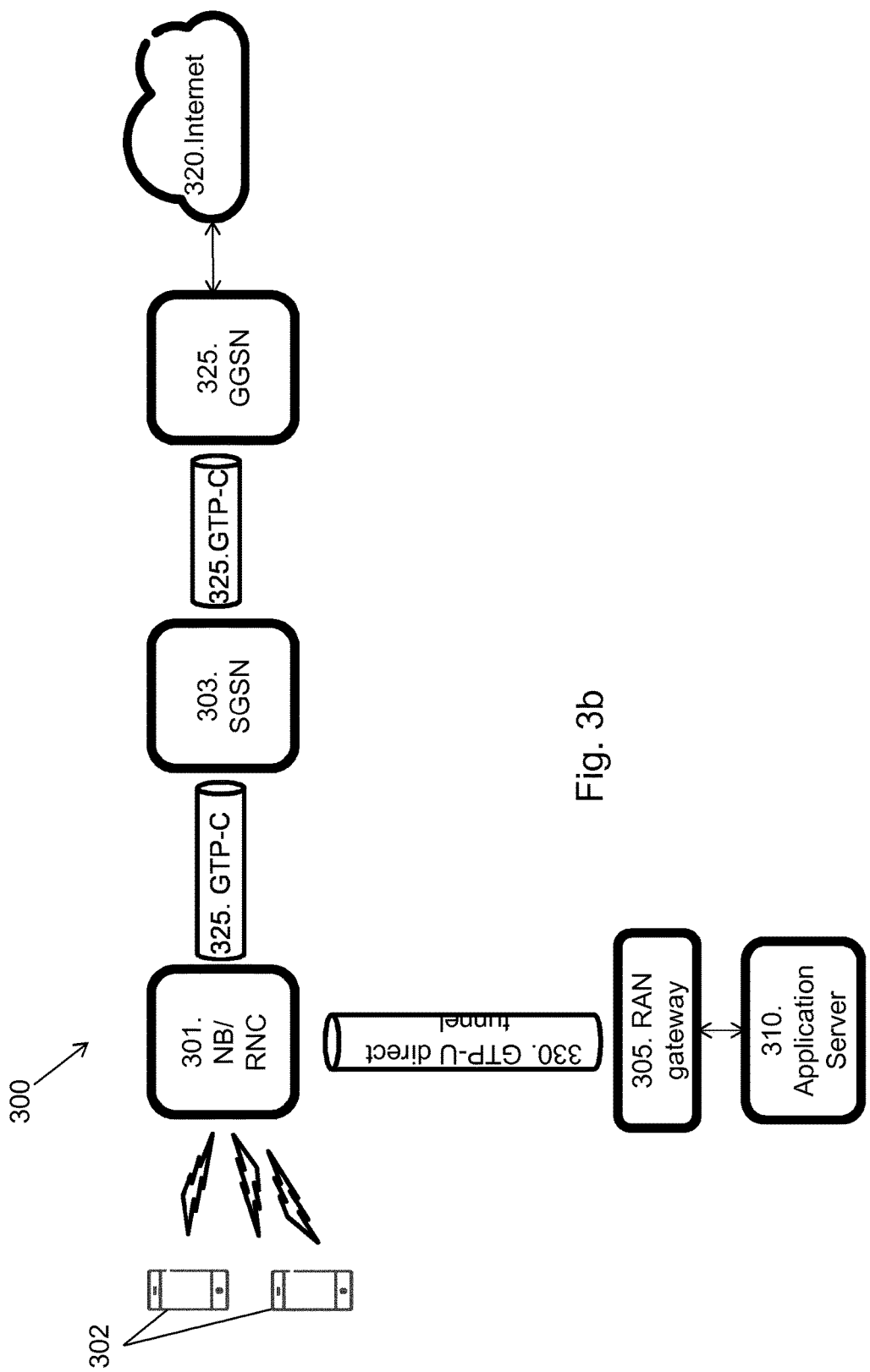
FIG. 3b is a schematic block diagram illustrating embodiments of a communications system applying WCDMA and comprising a GTP-U direct tunnel.

FIG. 3b is a schematic block diagram illustrating embodiments of the communications system 300 when applying WCDMA. As seen in FIG. 3b, the RAN node 301 is represented by an NB or a RNC 301, the CN node 303 is represented by a SGSN. In addition, the communications system 300 applying WCDMA comprises a GGSN 325. Similar to FIG. 3a, the communications system 300 comprises a RAN gateway 305, a Proximity application Server 310 and Internet 320.

The GTP-C tunnel 325 is located between NB/RNC 301 and the SGSN 303, and between the SGSN 303 and the GGSN 325. The GTP-U direct tunnel 330 is located between the NB/RNC 301 and the RAN gateway 305.

Figure 3C:
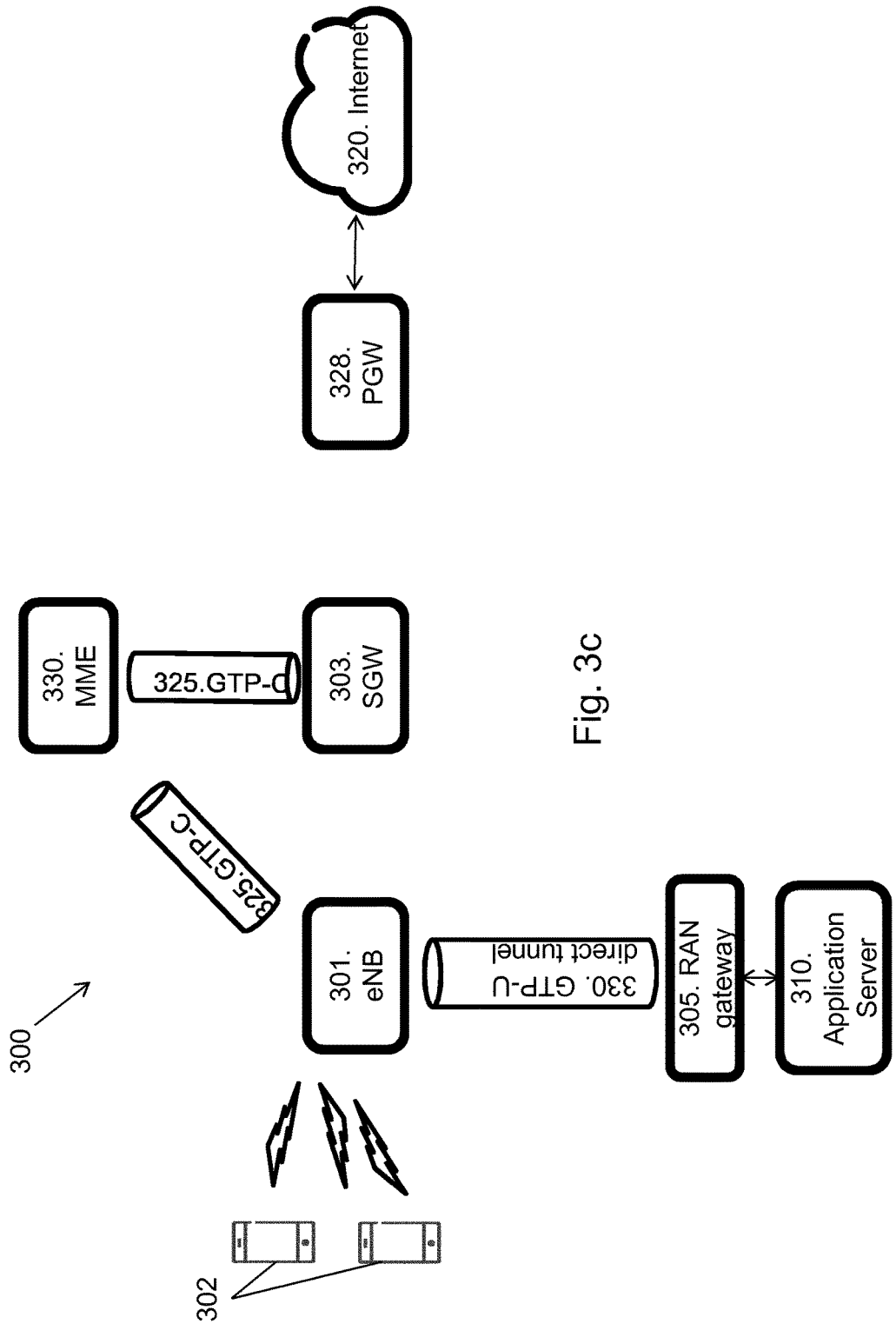
FIG. 3c is a schematic block diagram illustrating embodiments of a communications system applying LTE and comprising a GTP-U direct tunnel.

FIG. 3c is a schematic block diagram illustrating embodiments of the communications system 300 when applying LTE. As seen in FIG. 3c, the RAN node 301 is represented by an eNB 301, the CN node 303 is represented by a SGW. In addition, the communications system 300 when applying LTE comprises a PGW 328 and a MME 330. Similar to FIG. 3a, the communications system 300 comprises a RAN gateway 305, a Proximity application Server 310 and Internet 320.

The GTP-C tunnel 325 in FIG. 3c is located between eNB 301 and the MME 330, and between the MME 330 and the SGW 303. The GTP-U direct tunnel 330 is located between the eNB 301 and the RAN gateway 305.

Figure 3D:
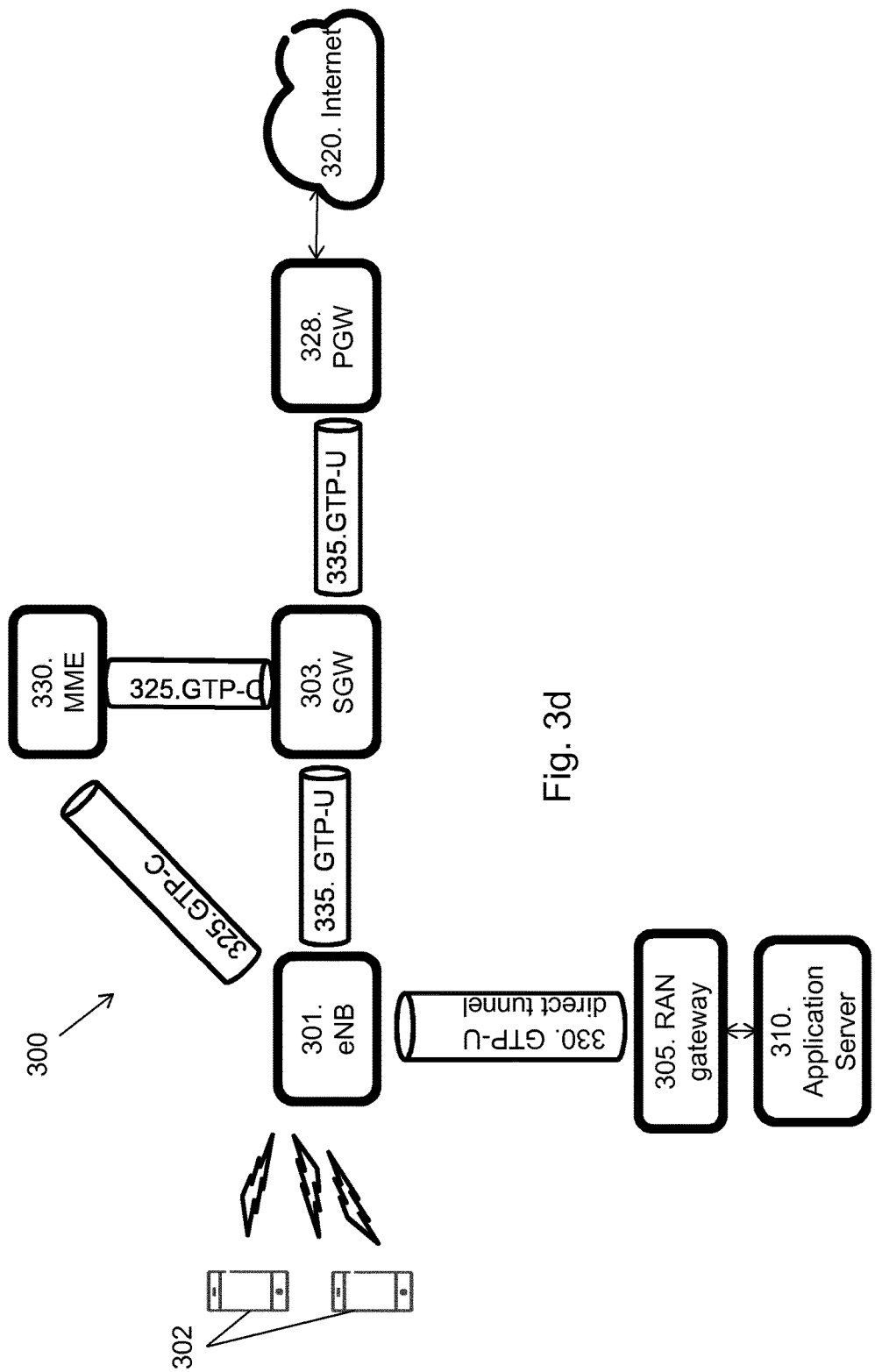
FIG. 3d is a schematic block diagram illustrating embodiments of a communications system applying LTE and comprising a GTP-U direct tunnel and a GTP-U tunnel.

FIG. 3d is a schematic block diagram illustrating embodiments of the communications system 300 when applying LTE, and where the communications system 300 comprises a GTP-U tunnel 335 in addition to the GTP-U direct tunnel 330. The nodes in FIG. 3d are the same as the ones described for FIG. 3c so they will not be repeated here for the sake of simplicity.

The GTP-C tunnel 325 in FIG. 3d is located between the eNB 301 and the MME 330, and between the MME 330 and the SGW 303. GTP-U tunnel 335 is located between the eNB 301 and the SGW 330, and between the SGW 303 and the PGW 328. In addition to the GTP-U tunnel 335, there is a GTP-U direct tunnel 330 which is located between the eNB 301 and the RAN gateway 305.

The method for handling a GTP-U tunnel according to some embodiments will now be described with reference to the signalling diagram depicted in FIG. 4 and with reference to FIG. 3a. The method comprises the following steps, which steps may as well be carried out in another suitable order than described below:

Step 401

The CN node 303 sends a first message to the RAN gateway 305. The first message comprises a request for information identifying the RAN gateway 305.

Step 402

The RAN gateway 305 sends a second message to the CN node 303. The second message may be a response to the first message in step 401. The second message comprises the requested information identifying the RAN gateway 305. The information identifying the RAN gateway 305 may be at least part of the F-TEID. The TEID comprises a plurality of parameters such as e.g. a TEID and an End User IP address. The information identifying the RAN gateway 305 may be transmitted in a GTP-C Create Bearer request message.

Step 403

The CN node 303 determines a first endpoint node and a second endpoint node of the GTP-U tunnel. The first endpoint node is the RAN node 301 and the second endpoint node is the RAN gateway 305. Thus, there is a GTP-U direct tunnel between the RAN node 301 and the RAN gateway 305.

Step 404

The CN node 303 may transmit a third message to the RAN gateway 305. The third message comprises information confirming that the RAN gateway 305 is the second endpoint node for the GTP-U tunnel.

Step 405

The wireless device 305 may transmit user plane data which passes the RAN node 303, the RAN gateway 305, the proximity application server 310 and back to the wireless device 305.

Figure 5:
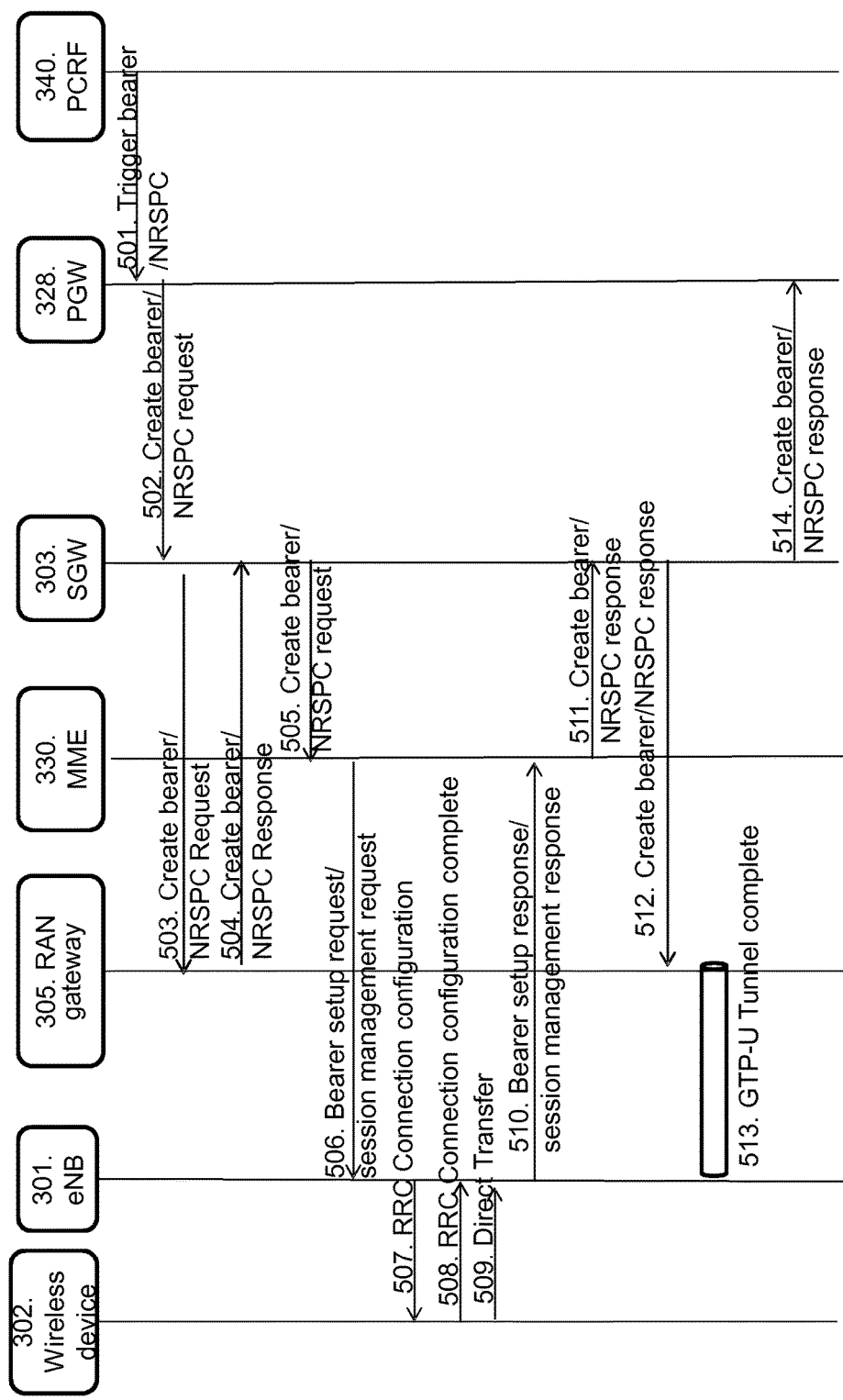
FIG. 5 is a signaling diagram illustrating embodiments of a method in a network applying LTE.

The method for handling a GTP-U tunnel according to some embodiments will now be described with reference to the signalling diagram depicted in FIG. 5. In FIG. 5, the communications system 300 is based on LTE (i.e. not WCDMA) such as exemplified in FIGS. 3c and 3d, but the principle of the method is the same. In addition to the nodes seen in FIGS. 3c and 3d, the communications network 300 comprises a Policy and Charging Rules Function (PCRF) 340. The method comprises the following steps, which steps may as well be carried out in another suitable order than described below:

Step 501

The PCRF 340 sends, to the PGW 328, a message comprising a trigger for a dedicated bearer or a for a Network Requested Secondary Packet data protocol Context (NRSPC).

Step 502

The PGW 328 sends a request message to the SGW 303. The message is a create dedicated bearer request or a NRSPC request.

Step 503

The SGW 303 sends (i.e. forwards) the request message from step 502 to the RAN gateway 305, i.e. the create dedicated bearer request or the NRSPC request.

Step 504

The RAN gateway 305 sends a response message back to the SGW 303, i.e. a response to the request message in step 503. The response message is a create dedicated bearer response or a NRSPC response.

Step 505

The SGW 303 sends (i.e. forwards) the request message from step 402 to the MME 330, i.e. the create dedicated bearer request or the NRSPC request.

Step 506

The MME 330 sends a request message to the eNB 301. The request message is a bearer setup request or a session management request.

Step 507

The eNB 301 sends, to the wireless device 315, information indicating that the wireless device 315 should perform a RRC Connection configuration.

Step 508

When the wireless device 302 has performed the RRC Connection configuration, the wireless device 302 sends, to the eNB 301 and in response to the information sent in step 507, information indicating that the RRC connection configuration is completed.

Step 509

The wireless device 302 sends a Direct Transfer message to the eNB 301. The direct transfer message may comprise a session management response message.

Step 510

The eNB 301 sends a response message to the MME 330. The response message is a bearer setup response or a session management response. The response message is a response to the request message in step 506.

Step 511

The MME 330 sends a response message to the SGW 303. The response message is a create dedicated bearer response message or a NRSPC response message. The response message is a response to the request message in step 505.

Step 512

The SGW 301 sends (i.e. forwards) the response message to the RAN gateway 305, i.e. the response message which the SGW 303 received from the MME 330 in step 511. The response message is a create dedicated bearer response or a NRSPC response.

Step 513

The setup of the GTP-U direct tunnel 330 between the eNB 301 and the RAN gateway 305 is complete.

Step 514

The SGW 301 sends a response message to the PGW 328. The response message is a create dedicated bearer response message or a NRSPC response message. The response message is a response to the request message in step 502.

For the embodiments herein may the following may need to be implemented in to the 3GPP Network GTP-U Direct Tunnel activation software function in CN node 303.

GTP-U endpoint software function within or in proximity to the RAN node 305.

Figure 6:
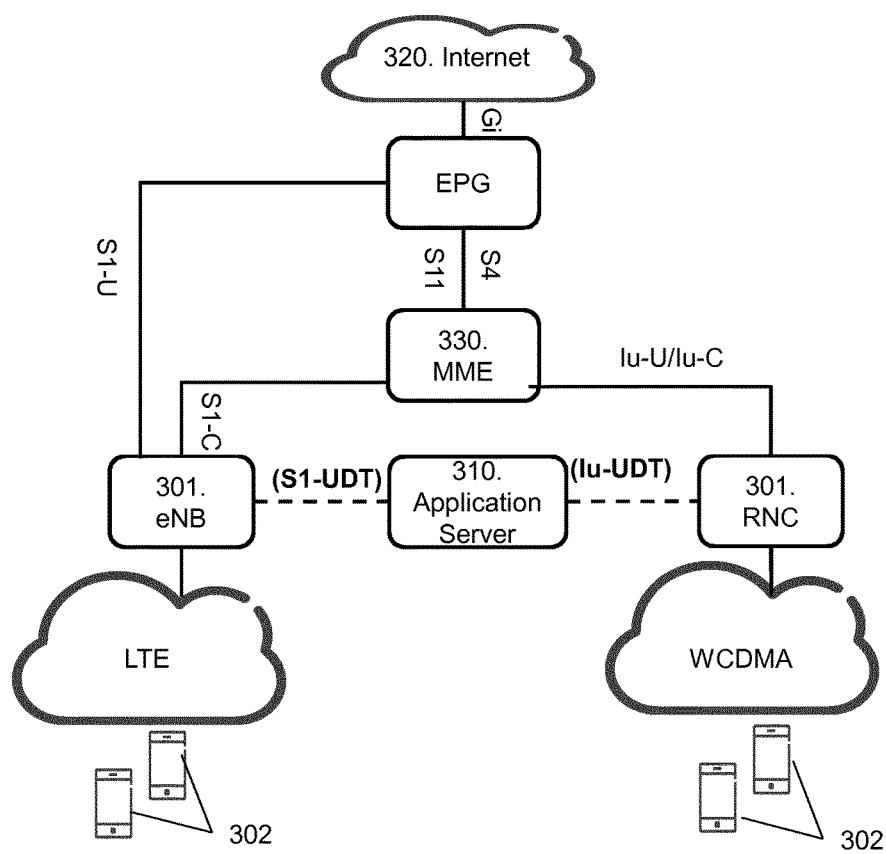
FIG. 6 is a schematic block diagram illustrating embodiments of a communications network.

FIG. 6 is a schematic block diagram illustrating the direct tunneling, where the GTP-U direct tunnel 330 is illustrated with a dotted line. The left hand side of FIG. 6 represents LTE and an eNB as a RAN node 301, and the right hand side of FIG. 6 represents WCDMA and a RNC as a RAN node 301. The interface between the eNB 301 and the EPG may a S1-U interface, the interface between the eNB 301 and the MME 330 may be a S1-C interface, the interface between the eNB 301 and the application server 310 may be a S1-UDT interface. The interface between the RNC 301 and the MME 330 may be an Iu-U/Iu-C interface and the interface between the RNC 301 and the application server 310 may be the Iu-UDT interface. The interface between EPG and Internet 320 may be a Gi interface. FIG. 6 is illustrated with two wireless devices 302 served by the eNB 301 and the RNC 301 respectively. However, the skilled person will understand that any other suitable number of wireless devices 302 may also be applicable.

The CN node 303 or the EPG may comprise an EPG Direct Tunnel activation software function which may have the following functions Requesting F-TEID from GTP-U endpoint software function Forwarding of F-TEID information in GTP-C Create Bearer request The responsibility of the Direct Tunnel Software Function may be described as to request an F-TEID from the GTP-U endpoint function when a new direct tunnel EPS bearer/NRSPC is requested. This may done by sending an initial GTP-C Create bearer request to the GTP-U endpoint function and then reuse the F-TEID IE in the bearer context IE in the GTP-C Create bearer context response from the GTP-U endpoint function as source F-TEID in the GTP-C create bearer request sent from the SGW to MME.

In FIG. 6, the RAN gateway 305 is not illustrated but it is comprised in the RAN node 301, i.e. the eNB 301 and/or the RNC 301. The RAN gateway 305 may comprise a GTP endpoint software function which may the following functions Common hosting of GTP-U tunnel endpoints for direct tunneling.

Providing the EPG or CN node 303 with local F-TEID for GTP-U tunnel redirection.

The responsibility of GTP-U endpoint software functions may be to respond to GTP-C Create bearer request originating from EPGs/CN nodes 303, create and host GTP-U Direct Tunneling endpoints for mobile clients towards the local application environment. As mentioned above, the GTP endpoint software function may be hosted by the eNB/RNC 31 or implemented as an external application server serving unit, i.e. a standalone RAN gateway 305.

Figure 7:
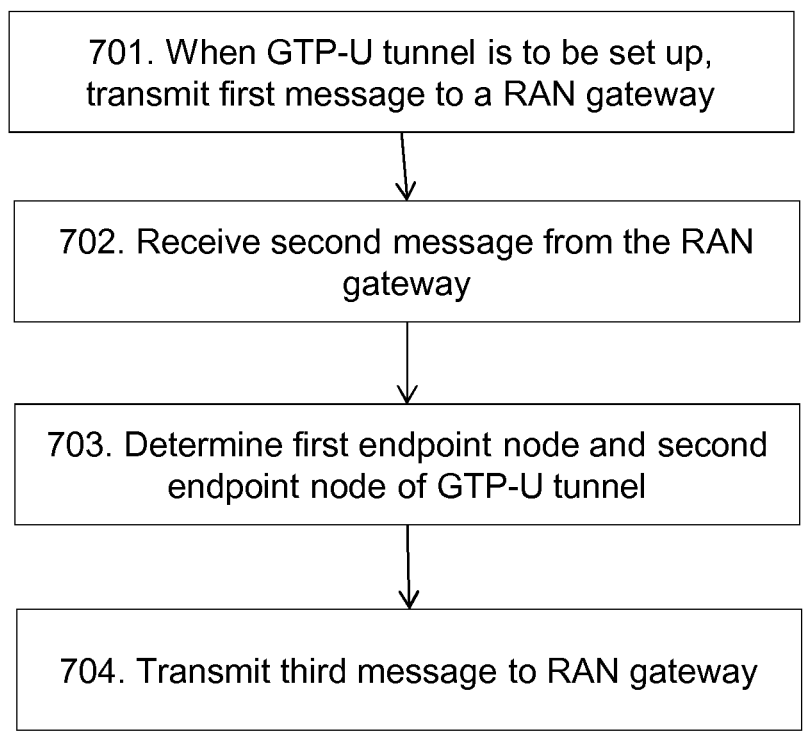
FIG. 7 is a flow chart illustrating embodiments of a method performed by a CN node.

The method described above will now be described seen from the perspective of the CN node 303. FIG. 7 is a flowchart describing the present method in the CN node 303, for handling the GTP-U tunnel. In some embodiments, the CN node 303 is a SGSN and the RAN node 301 is a RNC or a NB. In other embodiments, the CN node 303 is a SGW and the RAN node 301 is an eNB. The RAN node 301 and the RAN gateway 305 may be each standalone nodes located in proximity of each other, or the RAN gateway 305 may be co-located with the RAN node 301. The method comprises the following steps to be performed by the CN node 303, which steps may as well be carried out in another suitable order than described below:

Step 701

Figure 4:
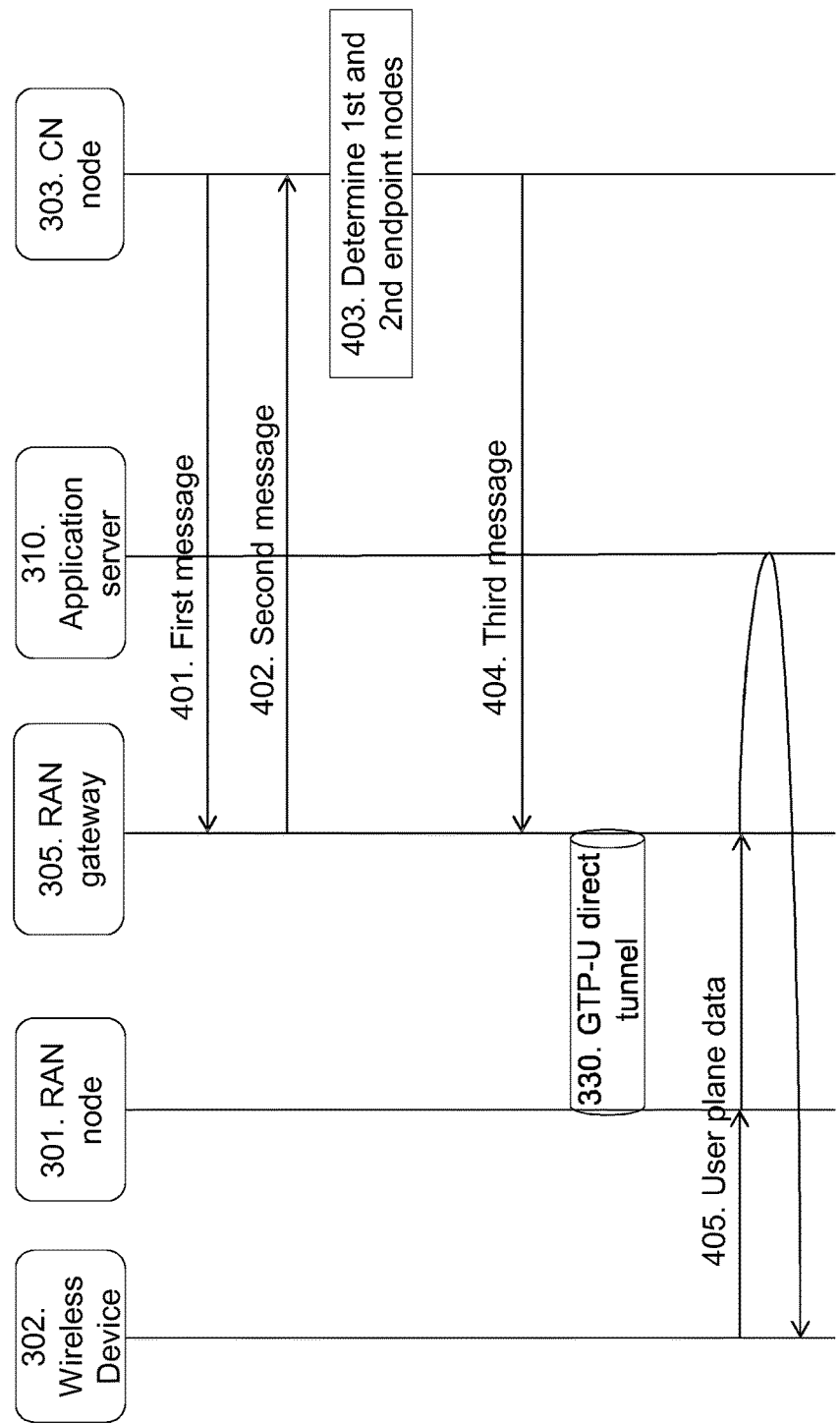
FIG. 4 is a signaling diagram illustrating embodiments of a method.

This step corresponds to step 401 in FIG. 4 and step 503 in FIG. 5. When the GTP-U tunnel is to be set up, the CN node 303 transmits a first message to the RAN gateway 305. The first message comprises a request for information identifying the RAN gateway 305. The information identifying the RAN gateway 305 may be at least a part of an F-TEID.
Step 702

This step corresponds to step 402 in FIG. 4 and step 504 in FIG. 5. The CN node 303 receives a second message from the RAN gateway 305. The second message comprises the requested information identifying the RAN gateway 305.
Step 703

This step corresponds to step 403 in FIG. 4. The CN node 303 determines a first endpoint node and a second endpoint node of the GTP-U tunnel. The first endpoint node is the RAN node 301 and the second endpoint node is the RAN gateway 305. The GTP-U tunnel may be a GTP-U direct tunnel 330 between the RAN node 301 and the RAN gateway 305.
Step 704

This step corresponds to step 404 in FIG. 4 and step 502 in FIG. 5. In some embodiments, the CN node 303 transmits a third message to the RAN gateway 305. The third message comprises information confirming that the RAN gateway 305 is the second endpoint node for the GTP-U tunnel.

In some embodiments, the first messages is a create bearer request message and the second and third messages are each a create bearer response message. In other embodiments, the first message is a NRSPC request message and the second and third messages are each a NRSPC response message. The create bearer request message may be a GTP-C create bearer request message and the create bearer response message may be a GTP-C create bearer response message.

A computer program may comprising instructions which, when executed on at least one processor, cause the at least one processor to carry out the method as described with reference to FIGS. 4, 5 and 7. A carrier may comprise the computer program, and the carrier is one of an electronic signal, optical signal, radio signal or computer readable storage medium.

Figure 8:
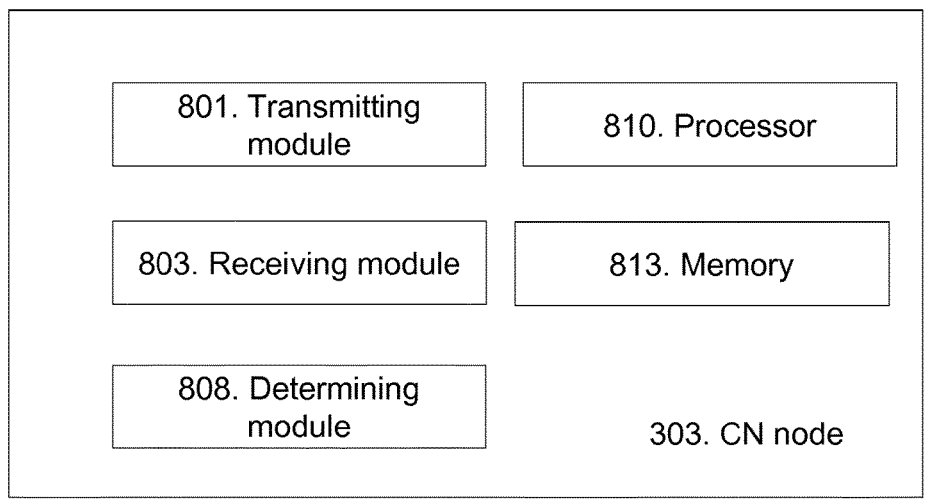
FIG. 8 is a schematic block diagram illustrating embodiments of CN node.

Embodiments of the CN node 303 configured to perform the method actions for handling a GTP-U tunnel, as described above in relation to FIGS. 4, 5 and 7 is depicted in FIG. 8. In some embodiments, the CN node 303 is a SGSN and the RAN node 301 is a RNC or a NB. In other embodiments, the CN node 303 is a SGW and the RAN node 301 is an eNB. The RAN node 301 and the RAN gateway 305 may each be standalone nodes located in proximity of each other, or the RAN gateway 305 may be co-located with the RAN node 301.

The CN node 303 is adapted to, e.g. by means of a transmitting module 801, when the GTP-U tunnel is to be set up, transmit a first message to the RAN gateway 305. The first message comprises a request for information identifying the RAN gateway 305. The information identifying the RAN gateway 305 may be at least a part of an F-TEID. The transmitting module 801 may also be referred to as a transmitting unit, a transmitting means, a transmitting circuit, means for transmitting or an output unit. The transmitting module 801 may be a transmitter, a transceiver etc. The transmitting module 801 may be a wireless transmitter of the CN node 303 of a wireless or fixed communications system.

The CN node 303 is further adapted to, e.g. by means of a receiving module 803, receive a second message from the RAN gateway 305. The second message comprises the requested information identifying the RAN gateway 305. The receiving module 803 may also be referred to as a receiving unit, a receiving means, a receiving circuit, means for receiving or an input unit. The receiving module 803 may be a receiver, a transceiver etc. The receiving module 803 may be a wireless receiver of the CN node 303 of a wireless or fixed communications system.

The CN node 303 is further adapted to, e.g. by means of a determining module 808, determine a first endpoint node and a second endpoint node of the GTP-U tunnel. The first endpoint node is the RAN node 301 and the second endpoint node is the RAN gateway 305. The GTP-U tunnel may be a GTP-U direct tunnel between the RAN node 301 and the RAN gateway 305. The determining module 808 may also be referred to as a determining unit, a determining means, a determining circuit or means for determining. The determining module 808 may be a processor 810 of the CN node 303.

The CN node 303 may be further adapted to, e.g. by means of the transmitting module 801, transmit a third message to the RAN gateway 305. The third message comprises information confirming that the RAN gateway 305 is the second endpoint node for the GTP-U tunnel.

In some embodiments, the first messages is a create bearer request message and the second and third messages are each a create bearer response message. In other embodiments, the first message is a NRSPC request message and the second and third messages are each a NRSPC response message. The create bearer request message may be a GTP-C create bearer request message and the create bearer response message may be a GTP-C create bearer response message.

The CN node 303 may further comprise a memory 813 comprising one or more memory units. The memory 813 is arranged to be used to store data, received data streams, the first message, the second message, the third messages, information identifying the RAN gateway, information indicating the first and second endpoints, threshold values, time periods, configurations, schedulings, and applications to perform the methods herein when being executed in the CN node 303.

Those skilled in the art will also appreciate that the transmitting module 801, the receiving module 803 and the determining module 808 described above may refer to a combination of analog and digital circuits, and/or one or more processors configured with software and/or firmware, e.g. stored in a memory, that when executed by the one or more processors such as the processor 810 perform as described below.

Figure 9:
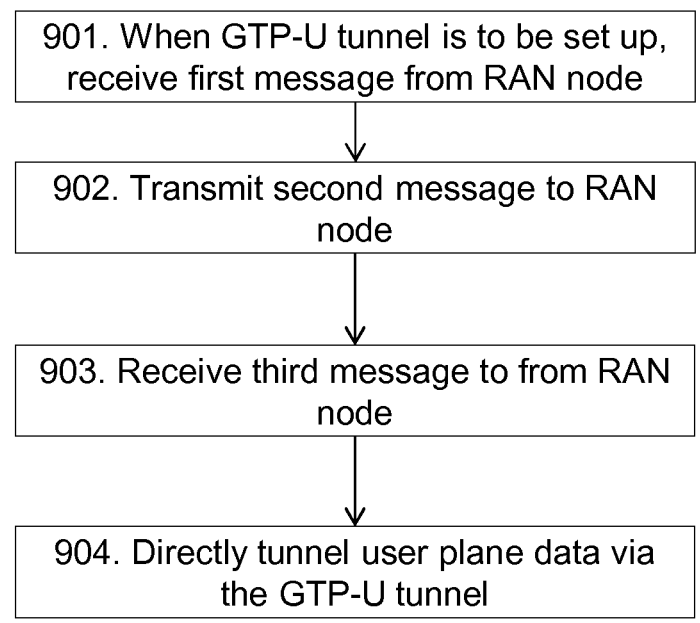
FIG. 9 is a flow chart illustrating embodiments of a method performed by a RAN gateway.

The method described above will now be described seen from the perspective of the RAN gateway 305. FIG. 9 is a flowchart describing the present method in the RAN gateway 305 for handling a GTP-U tunnel. In some embodiments, the CN node 303 is a SGSN and the RAN node 301 is a RNC or a NB. In other embodiments, the CN node 303 is a SGW and the RAN node 301 is an eNB. The RAN node 301 and the RAN gateway 305 may be each standalone nodes located in proximity of each other, or the RAN gateway 305 may be co-located with the RAN node 301. The method comprises the following steps, which steps may be performed in any suitable order than described below:
Step 901

This step corresponds to step 401 in FIG. 4 and step 503 in FIG. 5. When the GTP-U tunnel is to be set up, the RAN gateway 305 receives a first message from a RAN node 301. The first message comprises a request for information identifying the RAN gateway 305. The information identifying the RAN gateway 305 may be at least a part of the F-TEID.
Step 902

This step corresponds to step 402 in FIG. 4 and step 504 in FIG. 5. The RAN gateway 305 transmits a second message to the RAN node 301. The second message comprises the requested information identifying the RAN gateway 305.

Step 903

This step corresponds to step 404 in FIG. 4 and step 512 in FIG. 5. In some embodiments, the RAN gateway 305 receives a third message to from the RAN node 301. The third message comprises information confirming that the RAN gateway 305 is the second endpoint node for the GTP-U tunnel.

Step 904

This step corresponds to step 405 in FIG. 4. The RAN gateway 305 directly tunnels user plane data via the GTP-U tunnel. The GTP-U tunnel may also be referred to as the GTP-U direct tunnel or the 3GPP GTP-U direct tunnel. The RAN node 301 is a first endpoint node of the GTP-U tunnel and the RAN gateway 305 is a second endpoint node of the GTP-U tunnel. The user plane data may be directly tunneled between a first wireless device 315 and a second wireless device 315. The user plane data may be directly tunneled via the GTP-U tunnel when the RAN node 303 is without CN connection. The user plane data may be directly tunneled via the GTP-U tunnel when the user plane data fulfills a specific criterion. An example of a criterion may be that an Application Function (AF) requests a direct tunnel bearer (or all new bearers) to be direct tunnel enabled. The GTP-U tunnel may be a direct tunnel between the RAN node 301 and the RAN gateway 305.

In some embodiments, the first messages is a create bearer request message and the second and third messages are each a create bearer response message. In other embodiments, the first message is a NRSPC request message and the second and third messages are each a NRSPC response message. The create bearer request message may be a GTP-C create bearer request message and the create bearer response message is a GTP-C create bearer response message.

A computer program may comprising instructions which, when executed on at least one processor, cause the at least one processor to carry out the method as described with reference to FIGS. 4, 5 and 9. A carrier may comprise the computer program, and the carrier is one of an electronic signal, optical signal, radio signal or computer readable storage medium.

Figure 10:
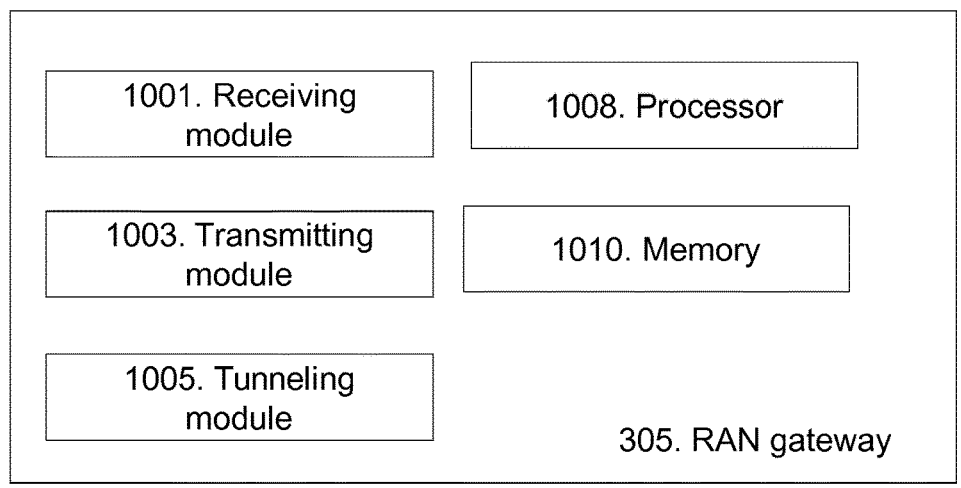
FIG. 10 is a schematic block diagram illustrating embodiments of RAN gateway.

Embodiments of the RAN gateway 305 configured to perform the method actions for handling a GTP-U tunnel, as described above in relation to FIGS. 4, 5 and 9 is depicted in FIG. 10. In some embodiments, the CN node 303 is a SGSN and the RAN node 301 is a RNC or a NB. In other embodiments, the CN node 303 is a SG, and the RAN node 301 is an eNB. The RAN node 301 and the RAN gateway 305 may each be standalone nodes located in proximity of each other, or the RAN gateway 305 may be co-located with the RAN node 301.

The RAN gateway 305 is adapted to, e.g. by means of a receiving module 1001, when the GTP-U tunnel is to be set up, receive a first from the RAN node 301. The first message comprises a request for information identifying the RAN gateway 305. The information identifying the RAN gateway 305 may be at least a part of the F-TEID. The receiving module 1001 may also be referred to as a receiving unit, a receiving means, a receiving circuit, means for receiving or an input unit. The receiving module 1001 may be a receiver, a transceiver etc. The receiving module 1001 may be a wireless receiver of the RAN gateway 305 of a wireless or fixed communications system.

The RAN gateway 305 is further adapted to, e.g. by means of a transmitting module 1003, transmit a second message to the RAN node 301. The second message comprises the requested information identifying the RAN gateway 305. The transmitting module 1003 may also be referred to as a transmitting unit, a transmitting means, a transmitting circuit, means for transmitting or an output unit. The transmitting module 1003 may be a transmitter, a transceiver etc. The transmitting module 1003 may be a wireless transmitter of the RAN gateway 305 of a wireless or fixed communications system.

The RAN gateway 305 is further adapted to, e.g. by means of a tunneling module 1005, directly tunnel user plane data via the GTP-U tunnel. The RAN node 301 is a first endpoint node of the GTP-U tunnel and the RAN gateway 305 is a second endpoint node of the GTP-U tunnel. The user plane data may be directly tunneled via the GTP-U tunnel when the RAN node 303 is without CN connection. The user plane data may be directly tunneled via the GTP-U tunnel when the user plane data fulfills a criterion. The GTP-U tunnel may be a direct tunnel between the RAN node 301 and the RAN gateway 305.

The tunneling module 1005 may also be referred to as a tunneling unit, a tunneling means, a tunneling circuit or means for tunneling. The tunneling module 1005 may be a processor 1008 of the RAN gateway 305.

The RAN gateway 305 may be further adapted to, e.g. by means of the receiving module 1001, receive a third message to from the RAN node 301. The third message comprises information confirming that the RAN gateway 305 is the second endpoint node for the GTP-U tunnel.

In some embodiments, the first messages is a create bearer request message and the second and third messages are each a create bearer response message. In other embodiments, the first message is a NRSPC request message and the second and third messages are each a NRSPC response message. The create bearer request message may be a GTP-C, create bearer request message and the create bearer response message may be a GTP-C create bearer response message.

The RAN gateway 305 may further comprise a memory 1010 comprising one or more memory units. The memory 1010 is arranged to be used to store data, received data streams, the first message, the second message, the third messages, information identifying the RAN gateway, information indicating the first and second endpoints, threshold values, time periods, configurations, schedulings, and applications to perform the methods herein when being executed in the RAN gateway 305.

Those skilled in the art will also appreciate that the receiving module 1001, the transmitting module 1003 and the tunnelling module 1005 described above may refer to a combination of analog and digital circuits, and/or one or more processors configured with software and/or firmware, e.g. stored in a memory, that when executed by the one or more processors such as the processor 1008 perform as described below.

The present mechanism for handling the GTP-U tunnel may be implemented through one or more processors, such as the processor 810 in the CN node arrangement depicted in FIG. 8 and a processor 1008 in the RAN gateway arrangement depicted in FIG. 10, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into at least one of the CN node 303 and the RAN gateway 305. One such carrier may be in the form of a CD ROM disc. It is however feasible with other data carriers such as a memory stick. The computer program code can furthermore be provided as pure program code on a server and downloaded to the at least one of the CN node 303 and the RAN gateway 305.

As mentioned above, a 3G Direct Tunnel may be realized for WCDMA systems, where the main use-case is to bypass and relieve the SGSN of transit traffic to and from the GGSN. The 3GPP direct tunnel in the embodiments herein takes this one step further, enabling a direct connection between the wireless device/RAN node and local application services.

One problem is that today it is not possible to terminate the GTP-U tunnel locally at the RAN node site where the local application servers are placed. The GTP-U tunnel endpoint function may be realized in the RAN node but may also be terminated at an external local entity.

Another problematic issue with the current technology may that the packet core network introduces unnecessary latency and traffic load for end to end communication for wireless devices within the same coverage area. If an RAN node is separated/disconnected from the packet core network for any reason, wireless devices registered to that RAN node will lose the ability to send data on their existing packet data connections. By having the GTP-U tunnel endpoint function, wireless devices which are 3GPP direct tunneling enabled and which communicates with local application servers may continue to function without connection to the packet core network.

The embodiments herein make it possible to forward dedicated traffic flows to an external Application server without the need to pass through the SGSN/PGW. Bypassing the SGSN/PGW will offload the SGSN/PGW, reduce network latency, support local service applications and data services continuation of existing connections in case of loss of packet core network.

A typical use-case may be when using a satellite backhaul where the embodiments herein reduce the need for user-plane traffic over the satellite link since local applications may be co-located with the RAN node.

An example of a resilience feature in some commonly deployed Public Safety communications systems may be that the RAN node continues to work without core network connection, keeping attached wireless devices connected and able to use local applications. Enabling 3GPP direct tunneling may be a step on the road to realizing this required function also in 3GPP networks.

The embodiments herein are not limited to the above described embodiments. Various alternatives, modifications and equivalents may be used. Therefore, the above embodiments should not be taken as limiting the scope of the embodiments, which is defined by the appending claims.

The term "configured to" used herein may also be referred to as "arranged to" or "adapted to" or "operable to".

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear in the claims.

The invention claimed is:

1. A method in a Core Network, CN, node for handling a General packet radio service Tunnelling Protocol-User plane, GTP-U, tunnel, the method comprising:
when the GTP-U tunnel is to be set up, the CN node transmitting a first message to a Radio Access Network, RAN, gateway, which first message comprises a request for information identifying the RAN gateway, wherein the CN node is one of a Serving General packet radio service Support Node, SGSN, and a Serving GateWay, SGW;
the CN node receiving a second message from the RAN gateway, which second message comprises the requested information identifying the RAN gateway; and
the CN node determining a first endpoint node and a second endpoint node of the GTP-U tunnel, wherein the first endpoint node is the RAN node and the second endpoint node is the RAN gateway, and wherein the GTP-U tunnel is a direct GTP-U tunnel between the first endpoint node and the second endpoint node.

2. The method according to claim 1, further comprising:
transmitting a third message to the RAN gateway, which third message comprises information confirming that the RAN gateway is the second endpoint node for the GTP-U tunnel.

3. The method according to claim 1, wherein the information identifying the RAN gateway is at least a part of a Fully qualified-Tunnel Endpoint Identifier, F-TEID.

4. The method according to claim 1, wherein the GTP-U tunnel is a direct tunnel between the RAN node and the RAN gateway.

5. The method according to claim 1, wherein the first message is a create bearer request message and the second and third messages are each a create bearer response message; or wherein the first message is a Network Requested Secondary Packet data protocol Context, NRSPC, request message and the second and third messages are each a NRSPC response message.

6. The method according to claim 5, wherein the create bearer request message is a GTP-Control plane, GTP-C, create bearer request message and the create bearer response message is a GTP-C create bearer response message.

7. The method according to claim 1, wherein the RAN node is one of a Radio Network Controller, RNC, a NodeB, NB, and an evolved Node B, eNB.

8. The method according to claim 1, wherein the RAN node and the RAN gateway are each standalone nodes located in proximity of each other; or wherein the RAN gateway is co-located with the RAN node.

9. A computer program comprising instructions which, when executed on at least one processor, cause the at least one processor to carry out the method according to claim 1.

10. A method in a Radio Access Network, RAN, gateway for handling a General packet radio service Tunnelling Protocol-User plane, GTP-U, tunnel, the method comprising:
when the GTP-U tunnel is to be set up, the RAN gateway receiving a first message from a Core Network, CN, node, which first message comprises a request for information identifying the RAN gateway, wherein the CN node is one of a Serving General packet radio service Support Node, SGSN, and a Serving GateWay, SGW;

the RAN gateway transmitting a second message to the CN node, which second message comprises the requested information identifying the RAN gateway; and the RAN gateway directly tunneling user plane data via the GTP-U tunnel, wherein a RAN node is a first endpoint node of the GTP-U tunnel and the RAN gateway is a second endpoint node of the GTP-U tunnel, and wherein the GTP-U tunnel is a direct GTP-U tunnel between the first endpoint node and the second endpoint node.

11. The method according to claim 10, further comprising:
receiving a third message from the CN node, which third message comprises information confirming that the RAN gateway is the second endpoint node for the GTP-U tunnel.

12. The method according to claim 10, wherein the user plane data is directly tunneled via the GTP-U tunnel when the RAN node is without CN connection.

13. The method according to claim 10, wherein the user plane data is directly tunneled via the GTP-U tunnel when the user plane data fulfills a criterion.

14. The method according to claim 10, wherein the information identifying the RAN gateway is at least a part of a Fully qualified-Tunnel Endpoint Identifier, F-TEID.

15. The method according to claim 10, wherein the GTP-U tunnel is a direct tunnel between the RAN node and the RAN gateway.

16. The method according to claim 10, wherein the first message is a create bearer request message and the second and third messages are each a create bearer response message; or wherein the first message is a Network Requested Secondary Packet data protocol Context, NRSPC, request message and the second and third messages are each a NRSPC response message.

17. The method according to claim 16, wherein the create bearer request message is a GTP-Control plane, GTP-C, create bearer request message and the create bearer response message is a GTP-C create bearer response message.

18. The method according to claim 10, wherein the RAN node is one of a Radio Network Controller, RNC, a NodeB, NB, and an evolved Node B, eNB.

19. The method according to claim 10, wherein the RAN node and the RAN gateway are each standalone nodes located in proximity of each other; or wherein the RAN gateway is co-located with the RAN node.

20. A computer program comprising instructions which, when executed on at least one processor, cause the at least one processor to carry out the method according to claim 10.

21. A Core Network, CN, node for handling a General packet radio service Tunnelling Protocol-User plane, GTP-U, tunnel, the CN node comprising:
a memory;
processing circuitry coupled to the memory, the processing circuitry configured to:
when the GTP-U tunnel is to be set up, transmit a first message to a Radio Access Network, RAN, gateway, which first message comprises a request for information identifying the RAN gateway, wherein the CN node is one of a Serving General packet radio service Support Node, SGSN, and a Serving GateWay, SGW;
receive a second message from the RAN gateway, which second message comprises the requested information identifying the RAN gateway; and
determine a first endpoint node and a second endpoint node of the GTP-U tunnel, wherein the first endpoint node is the RAN node and the second endpoint node is the RAN gateway, and wherein the GTP-U tunnel is a direct GTP-U tunnel between the first endpoint node and the second endpoint node.

22. The CN node according to claim 21, wherein the processing circuitry is further configured to:
transmit a third message to the RAN gateway, which third message comprises information confirming that the RAN gateway is the second endpoint node for the GTP-U tunnel.

23. The CN node according to claim 21, wherein the information identifying the RAN gateway is at least a part of a Fully qualified-Tunnel Endpoint Identifier, F-TEID.

24. The CN node according to claim 21, wherein the GTP-U tunnel is a direct tunnel between the RAN node and the RAN gateway.

25. The CN node according to claim 21, wherein the first message is a create bearer request message and the second and third messages are each a create bearer response message; or wherein the first message is a Network Requested Secondary Packet data protocol Context, NRSPC, request message and the second and third messages are each a NRSPC response message.

26. The CN node according to claim 25, wherein the create bearer request message is a GTP-Control plane, GTP-C, create bearer request message and the create bearer response message is a GTP-C create bearer response message.

27. The CN node according to claim 21, wherein the RAN node is one of a Radio Network Controller, RNC, a NodeB, NB, and an evolved Node B, eNB.

28. The CN node according to claim 21, wherein the RAN node and the RAN gateway are each standalone nodes located in proximity of each other; or wherein the RAN gateway is co-located with the RAN node.

29. A Radio Access Network, RAN, gateway for handling a General packet radio service Tunnelling Protocol-User plane, GTP-U, tunnel, the RAN gateway comprising:
a memory;
processing circuitry coupled to the memory, the processing circuitry configured to:
when the GTP-U tunnel is to be set up, receive a first from a Core Network, CN, node, which first message comprises a request for information identifying the RAN gateway, wherein the CN node is one of a Serving General packet radio service Support Node, SGSN, and a Serving GateWay, SGW;
transmit a second message to the CN node, which second message comprises the requested information identifying the RAN gateway; and
directly tunnel user plane data via the GTP-U tunnel, wherein a RAN node is a first endpoint node of the GTP-U tunnel and the RAN gateway is a second endpoint node of the GTP-U tunnel, and wherein the GTP-U tunnel is a direct GTP-U tunnel between the first endpoint node and the second endpoint node.

30. The RAN gateway according to claim 29, wherein the processing circuitry is further configured to:
receive a third message to from the CN node, which third message comprises information confirming that the RAN gateway is the second endpoint node for the GTP-U tunnel.

31. The RAN gateway according to claim 29, wherein the user plane data is directly tunneled via the GTP-U tunnel when the RAN node is without CN connection.

32. The RAN gateway according to claim 29, wherein the user plane data is directly tunneled via the GTP-U tunnel when the user plane data fulfills a criterion.

33. The RAN gateway according to claim 29, wherein the information identifying the RAN gateway is at least a part of a Fully qualified-Tunnel Endpoint Identifier, F-TEID.

34. The RAN gateway according to claim 29, wherein the GTP-U tunnel is a direct tunnel between the RAN node and the RAN gateway.

35. The RAN gateway according to claim 29, wherein the first message is a create bearer request message and the second and third messages are each a create bearer response message; or wherein the first message is a Network Requested Secondary Packet data protocol Context, NRSPC, request message and the second and third messages are each a NRSPC response message.

36. The RAN gateway according to claim 35, wherein the create bearer request message is a GTP-Control plane, GTP-C, create bearer request message and the create bearer response message is a GTP-C create bearer response message.

37. The RAN gateway according to claim 29, wherein the RAN node is one of a Radio Network Controller, RNC, a NodeB, NB, and an evolved Node B, eNB.

38. The RAN gateway according to claim 29, wherein the RAN node and the RAN gateway are each standalone nodes located in proximity of each other; or wherein the RAN gateway is co-located with the RAN node.

* * * * *